April 23, 1929.  L. F. DEFENBAUGH  1,710,410
FLOAT VALVE
Original Filed June 12, 1925
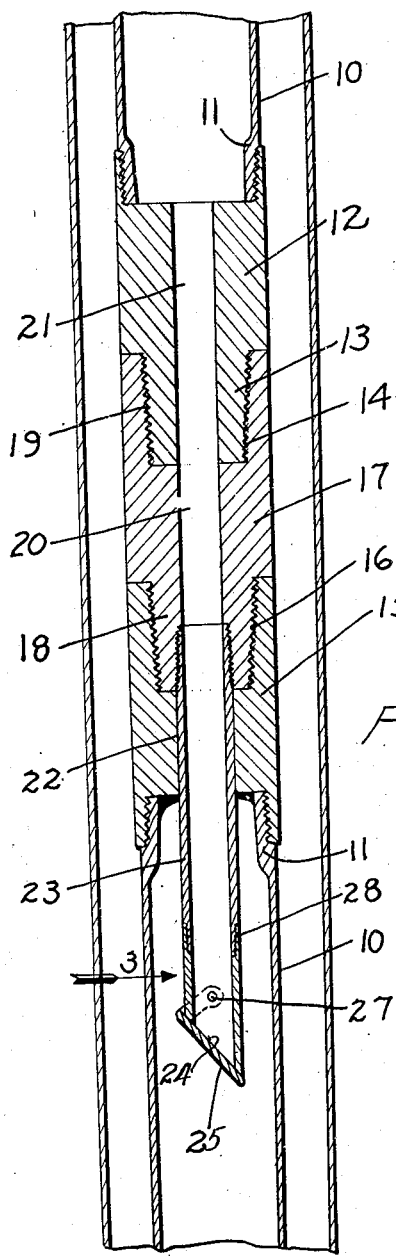
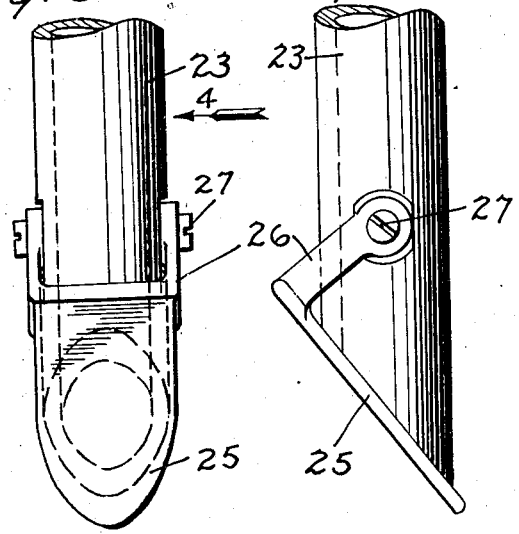
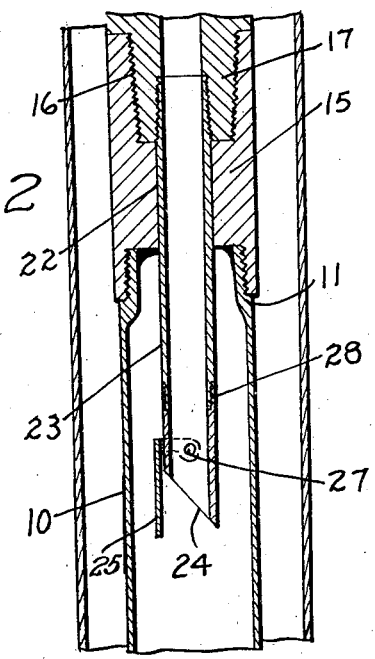
Inventor
Loyd F. Defenbaugh.
by: Hazard and Miller
Attys.

Patented Apr. 23, 1929.

1,710,410

UNITED STATES PATENT OFFICE.

LOYD F. DEFENBAUGH, OF COMPTON, CALIFORNIA.

FLOAT VALVE.

Application filed June 12, 1925, Serial No. 36,679. Renewed February 13, 1929.

This invention relates to improvements in float valves for drill pipes in drilling wells by means of a so-called rotary drilling outfit. In drilling deep wells the drill pipe must necessarily be pulled from the well hole from time to time to replace the drill or cutter. In such wells as are 4,000 or 5,000 feet deep, a 4,000 or 5,000 foot length of pipe has a considerable weight. In lowering the pipe into a well hole, this weight would necessarily be sustained by the drilling derrick, unless some provision were made for relieving the weight of the load carried by the derrick. Such provisions have heretofore been made by providing an upwardly closed check valve on the drill pipe somewhere adjacent its bottom so that as the drill pipe is lowered into a well hole, which is filled with mud or water, the fluid within the well hole will not enter the pipe, but will be kept out by the check valve, so that as the pipe is lowered, it will tend to float in the well hole and thus relieve the weight upon the derrick. Heretofore several types of check valves for drill pipes have been provided, some of which have been fairly satisfactory, and others of which have been quite disadvantageous. Many of these check valves when mounted upon its drill pipe reduces the size of passage through which the circulation fluid must pass after the drill pipe has been lowered and the drilling operations have been begun. Other types of check valves provide bends in the passages through which the fluid must be forced; and as the fluid used for circulation carries sand, grit and the like, the sand quickly cuts away the valve structure, so that it must frequently be replaced. Furthermore, those float valves for drill pipes which have bends in their passages increase the friction of the circulation fluid as it is forced downwardly through the drill pipe, putting an additional load upon the mud pumps or circulation pumps which force the circulation fluid downwardly through the drill pipe.

An object of this invention is to overcome many of these disadvantages. The improved float valve for drill pipes is so constructed that a straight continuous passage is provided through which the fluid may be forced, so that the additional friction provided by the valve will be practically negligible.

A further object of this invention is to provide an improved float valve for drill pipes which is so constructed that it will not be easily cut or worn by the sand or grit in the circulation fluid.

Another object of this invention is to provide a construction having a float valve for drill pipes in which the passage, through which the circulation fluid is forced, will be as large as possible, so that if chunks of rubber and other foreign material, which may be carried by the circulation fluid, encounter the valve, they will not become lodged adjacent it, so as to hamper its operation and restrict the flow therethrough.

With the foregoing and other objects in view which will be made manifest in the following detailed description and specifically pointed out in the appended claims, reference is had to the accompanying drawings for an illustrative embodiment of the invention, wherein:

Figure 1 is a vertical section through a portion of a drill pipe showing the improved valve in applied position and in closed position, Fig. 2 is a view similar to Fig. 1, showing the valve in open position, Fig. 3 is an enlarged elevational view of the valve taken substantially in the direction of the arrow 3 upon Fig. 1, and Fig. 4 is a side elevation of the valve taken in the direction of the arrow 4 upon Fig. 3.

Referring to the accompanying drawings wherein similar reference characters designate similar parts throughout, the drill tube or drill pipe is shown as formed of sections of drill pipe, indicated at 10. The conventional construction of these drill pipe sections is such that the ends of each section are upset, as indicated at 11, to provide a thickened portion, upon which the threads are cut. On the lower ends of the sections 10 there are mounted the pin sections 12 of tool joints, having pins 13 which are tapered and which are provided with tapered threads 14. The box sections of the tool joints are indicated at 15, which are mounted upon the upper ends of the sections 10 and which are provided with boxes 16 having interior threads complementary to the tapered threads 14 on the pins 13.

The improved float valve is preferably mounted upon a member 17, commonly known as a sub, provided on one end with a pin 18 receivable in the box 16, and on the other end with a box 19 capable of receiving the pin 13. In the sub there is formed a bore 20 which registers with bores 21 and 22 in the pin section 12 and the box section 15 of the tool joint. A tube 23 is mounted upon the bottom of the sub 17 and is so arranged as to form a continuation of the bore 20 downwardly through the box section 15. This tube is of such a length that its lower end extends into the interior of the subjacent pipe section 10 below its upset upper end 11. The lower end of the tube 23 is beveled off, as indicated at 24. A flat plate 25, constituting a closure plate, has formed integral therewith, or may have otherwise secured thereto, a pair of arms 26 adapted to be positioned upon opposite sides of the tube 23 and to be pivotally secured thereto as by screws 27. This plate is so arranged that it is capable of seating against the beveled surface on the lower end of the tube 23. Furthermore, its center of gravity is so arranged that it will normally swing into closed or seating position.

The operation of the device is as follows: When the drill tube having the improved float valve applied thereto is lowered into a well hole, the closure plate 25 will swing into its normal closed position, preventing fluid within the well from flowing upwardly into the tube 23. After the drill tube has been lowered into position to resume drilling operations, circulation fluid can be forced downwardly within the drill tube by the circulation pumps. The pressure of the circulation fluid will force the plate 25 from the position shown in Fig. 1 to the position shown in Fig. 2. In this position it will be readily appreciated that the tube 23 has its lower end completely open, and that it is a straight continuous passage without bends and which has substantially the same interior diameter throughout, extending through the pin section 12, the sub 17, the box section 15 and the tube 23, so that the friction of the circulation fluid is practically negligible, throwing no additional load upon the circulation pump. By extending the tube 23 downwardly into the interior of the subjacent section 10 below the upset 11, sufficient room is provided to permit the valve plate 25 to be moved into such position that the lower end of the tube will be completely opened. This would not be possible in most circumstances if the valve were located within the upset portion 11 or in the sub 17 or either of the tool joint sections.

The advantage of the device therefore resides particularly in locating the valve within the interior of a drill pipe section where there is sufficient room to allow it to completely open. Although the valve is preferably embodied upon the sub 17, it is not necessarily so constructed. The sub 17 is preferably employed so that the drill crew in pulling and lowering the drill pipe can determine from the exterior of the sections of drill pipe on which stand of pipe the valve is located. The sub 17 is preferably employed for the reason that exterior markings on the drill pipe to indicate on which stand the valve is located are usually unsatisfactory. It will be further noted that by the construction of the valve, there is very little wear caused by the sand and grit in the circulation fluid. It is, of course, appreciated that some wear will occur and that the valve may have to be replaced from time to time. Although the valve may have to be replaced, the wear upon the valve is much less than in other valves heretofore employed. In order to facilitate the replacement of the valve, the lower end of the tube 23 is detachable as indicated by threads 28, so that the lower end of the tube 23 together with the valve can be removed and a new valve substituted for it.

From the above it will be readily appreciated that an improved float valve for drill pipes is provided, which will not increase the load upon the circulation or mud pumps, which provides a straight continuous passage at the valve, reducing cutting by the sand and grit in the circulation fluid and which is so constructed as to permit a large passage at the valve which can be completely opened, through which the circulation fluid can be forced.

A characteristic feature of my float valve construction is in the manner of mounting the plate 25 whereby the arms 26, connected to the pin 27, and the particular position of the pin in substantially the center of the tube cause the center of gravity of the plate and the arms to be on one side of the pivot and thereby the weight of the plate and the arms causes the plate normally to swing into a self closing position against the lower beveled edge of the tube. As the normal tendency of this plate is to close or partly close, it is in a position, substantially as shown in Figs. 1 and 3, on the downward movement of the drill pipe so that any relative up-flowing liquid will positively seat the plate and cause a positive closure of the tube 23.

Where in the specification and claims I designate that the valve is selfclosing, this does not necessarily mean that my invention is restricted to an absolute closing valve for so long as the plate swings into a position so that the upward relative rush or flow of a liquid will bear against the valve structure and close same it would be the equivalent of my invention, as set forth in the description, drawings and claims.

It will be understood that various changes in the detail of construction may be made without departing from the spirit or scope of the invention as defined by the appended claims.

I claim:

1. In a drill pipe composed of drill pipe sections, a sub adapted to be mounted between the adjacent ends of two adjacent drill pipe sections, a vertical tube secured to the sub and extending downwardly therefrom into the interior of the next subjacent drill pipe section, and an upwardly substantially self closing check valve mounted upon said tube and disposed within the subjacent drill pipe section.

2. In a drill pipe composed of drill pipe sections, a sub adapted to be mounted between the adjacent ends of two adjacent drill pipe sections, a vertical tube secured to the sub and extending downwardly therefrom into the interior of the next subjacent drill pipe section, and an upwardly substantially self closing check valve mounted upon said tube and disposed within the subjacent drill pipe section below the upset upon its upper end.

3. In a drill pipe composed of pipe sections, means for connecting the adjacent ends of two pipe sections together, said means having a passage formed therethrough, a vertical tube forming a continuation of said passage downwardly into the interior of the subjacent pipe section, and an upwardly substantially self closing check valve mounted upon the lower end of said tube.

4. In a drill pipe composed of pipe sections, means for connecting the adjacent ends of two pipe sections together, said means having a passage formed therethrough, a vertical tube forming a continuation of said passage downwardly into the interior of the subjacent pipe section, said tube having its lower end beveled off, and a substantially self closing closure pivoted to said tube adapted to seat against said beveled end.

5. In a drill pipe composed of pipe sections, means for connecting the adjacent ends of two pipe sections together, said means having a passage formed therethrough, a tube forming a continuation of said passage downwardly into the interior of the subjacent pipe section, said tube having its lower end beveled off, and a plate having arms pivoted to the sides of the tube, said plate being adapted to seat upon the beveled end of said tube so as to prevent upward flow of fluid therethrough.

6. In a drill pipe composed of pipe sections, means for connecting the adjacent ends of two pipe sections together, said means having a passage formed therethrough, a tube forming a continuation of said passage downwardly into the interior of the subjacent pipe section, said tube having its lower end beveled off, and a plate having arms pivoted to the tube, said plate being so arranged that from its own weight it will normally tend to seat against the beveled end of said tube so as to close it against upward flow of fluid therethrough.

7. A float valve adapted to be applied to drill pipe comprising a sub adapted to be applied between the tool joint sections upon the adjacent ends of two adjacent pipe sections, said sub having a bore therethrough, a vertical tube secured to the sub forming a continuation of said bore extending therefrom a sufficient distance so as to have its end positioned within the interior of a subjacent pipe section, and a substantially self closing check valve mounted upon said tube adapted to prevent upward flow therethrough.

8. A float valve adapted to be applied to drill pipe comprising a sub adapted to be applied between the tool joint sections upon the adjacent ends of two adjacent pipe sections, said sub having a bore therethrough, a vertical tube secured to the sub forming a continuation of said bore extending downwardly therefrom a sufficient distance so as to have its lower end positioned within the interior of the subjacent pipe section, said tube having its lower end beveled off, and a plate pivoted to the tube, said plate being adapted to seat and being substantially self closing against the beveled end of said tube to prevent upward flow therethrough.

9. A float valve adapted to be applied to drill pipe comprising a sub adapted to be applied between the tool joint sections upon the adjacent ends of two adjacent pipe sections, said sub having a bore therethrough, a vertical tube secured to the sub forming a continuation of said bore extending downwardly therefrom a sufficient distance so as to have its lower end positioned within the interior of the subjacent pipe section, said tube having its lower end beveled off, and a plate pivoted to the tube, said plate being adapted to seat and being substantially self closing against the beveled end of said tube to prevent upward flow therethrough, the portion of the tube carried by the plate being detachable as and for the purpose described.

10. A float valve adapted to be applied to drill pipe comprising a sub adapted to be applied between the tool joint sections upon the adjacent ends of two adjacent pipe sections, said sub having a bore therethrough, a tube secured to the sub forming a continuation of said bore extending downwardly therefrom a sufficient distance so as to have its lower end positioned within the interior of the subjacent drill pipe section below its upset, said tube having its lower end beveled off, and a plate adapted to seat upon the beveled lower end of the tube, said plate having arms which are pivotally connected to the sides of the tube, whereby the plate from its own weight will naturally tend to seat upon the tube and prevent upward flow therethrough.

In testimony whereof I have signed my name to this specification.

LOYD F. DEFENBAUGH.